United States Patent
Shemkunas et al.

(10) Patent No.: US 12,220,761 B2
(45) Date of Patent: Feb. 11, 2025

(54) FRICTION STIR WELDING TOOL AND WELDING METHOD

(71) Applicant: THE BOEING COMPANY, Chicago, IL (US)

(72) Inventors: Michael Philip Shemkunas, Mukilteo, WA (US); Scott Anthony Rose, Wentzville, MO (US); Mario A. Reyes, Mercer Island, WA (US); Sean Michael Thuston, High Ridge, MO (US)

(73) Assignee: THE BOEING COMPANY, Chicago, IL (US)

( * ) Notice: Subject to any disclaimer, the term of this patent is extended or adjusted under 35 U.S.C. 154(b) by 98 days.

(21) Appl. No.: 18/063,353

(22) Filed: Dec. 8, 2022

(65) Prior Publication Data
US 2024/0189936 A1    Jun. 13, 2024

(51) Int. Cl.
*B23K 20/00* (2006.01)
*B23K 20/12* (2006.01)

(52) U.S. Cl.
CPC ...... *B23K 20/1255* (2013.01); *B23K 20/1235* (2013.01)

(58) Field of Classification Search
CPC .............. B23K 20/126; B23K 20/1245; B23K 20/1255; B23K 20/12; B23K 20/122; B23K 20/123; B23K 20/125; B23K 37/003
See application file for complete search history.

(56) References Cited

U.S. PATENT DOCUMENTS

| 2,190,125 A | * | 2/1940 | Sembdner | B21H 1/00 |
| | | | | 29/894.012 |
| 4,101,067 A | * | 7/1978 | Sloan | B23K 31/027 |
| | | | | 219/136 |
| 6,213,177 B1 | * | 4/2001 | Kempe | B27B 25/02 |
| | | | | 198/781.01 |

(Continued)

FOREIGN PATENT DOCUMENTS

EP     3881961 A1    9/2021

OTHER PUBLICATIONS

Hamilton Castor, https://www.hamiltoncaster.com/Polyurethane-Wheels, Apr. 12, 2021 from wayback machine (Year: 2021).*

(Continued)

*Primary Examiner* — Erin B Saad
(74) *Attorney, Agent, or Firm* — The Small Patent Law Group LLC; Philip S. Hof

(57) ABSTRACT

A friction stir welding (FSW) tool includes a pin, a housing, and a shoulder. The pin is configured to extend through a joint line between edges of two work pieces. The pin rotates to perform a FSW process that welds the two work pieces together at the joint line. The housing is coupled to a distal end of the pin to enable rotation of the pin relative to the housing. The pin extends through a support surface of the housing. The support surface contacts respective inner surfaces of the work pieces during the FSW process. The shoulder surrounds the pin and is configured to be rotated during the FSW process. The shoulder contacts respective outer surfaces of the work pieces during the FSW process such that the work pieces are sandwiched between the shoulder and the support surface of the housing.

20 Claims, 6 Drawing Sheets

(56) References Cited

U.S. PATENT DOCUMENTS

| | | | | |
|---|---|---|---|---|
| 7,832,613 | B2* | 11/2010 | Hanlon | B23K 20/1245 |
| | | | | 228/2.1 |
| 8,875,980 | B2* | 11/2014 | Saito | B23K 20/122 |
| | | | | 228/2.1 |
| 8,893,951 | B2* | 11/2014 | dos Santos | B23K 20/122 |
| | | | | 228/2.1 |
| 9,216,472 | B2* | 12/2015 | Sato | B23K 20/126 |
| 9,457,513 | B2* | 10/2016 | Hütsch | B23K 20/1255 |
| 9,687,934 | B2* | 6/2017 | Schindele | B23K 20/1215 |
| 9,700,958 | B2 | 7/2017 | Helmholtz | |
| 10,286,480 | B2* | 5/2019 | Schindele | B23K 20/1215 |
| 2003/0039716 | A1* | 2/2003 | Mizukusa | B29C 33/0083 |
| | | | | 249/79 |
| 2007/0267462 | A1* | 11/2007 | Burton | B23K 20/125 |
| | | | | 228/114.5 |
| 2009/0123778 | A1* | 5/2009 | Russell | B23K 20/1225 |
| | | | | 228/112.1 |
| 2010/0176182 | A1* | 7/2010 | Hanlon | B23K 20/126 |
| | | | | 228/2.1 |
| 2012/0248174 | A1* | 10/2012 | dos Santos | B23K 20/126 |
| | | | | 228/2.1 |
| 2014/0183245 | A1* | 7/2014 | Yamaguchi | B23K 20/127 |
| | | | | 228/2.1 |
| 2017/0304934 | A1* | 10/2017 | Carlson | B23K 20/1265 |
| 2019/0255647 | A1* | 8/2019 | Gandra | B23K 20/1255 |

OTHER PUBLICATIONS

Extended European Search Report for related EP App. 23199532 dated Mar. 31, 2024 (9 pages).

* cited by examiner

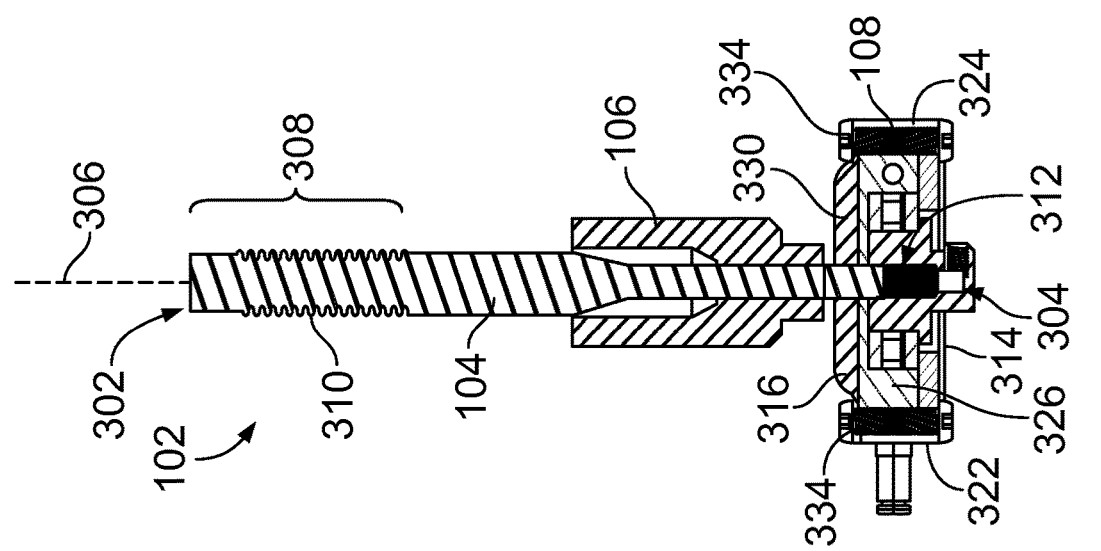
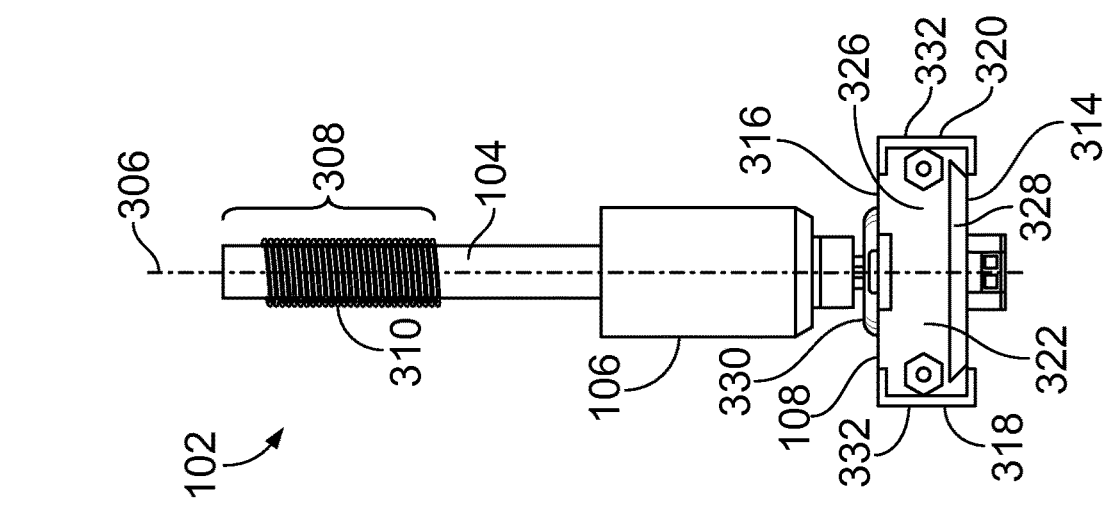
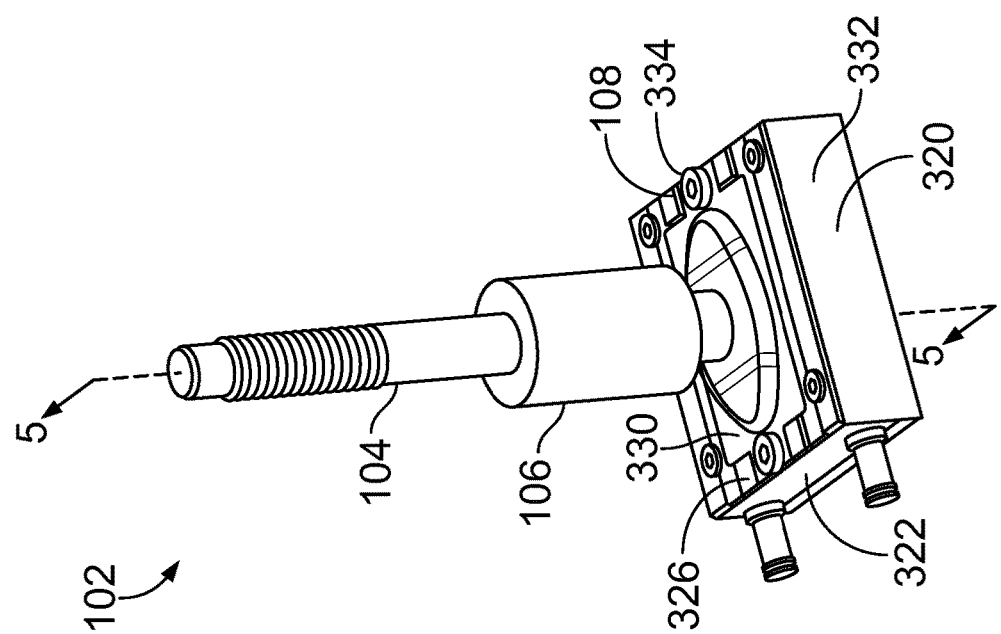

FRICTION STIR WELDING TOOL AND WELDING METHOD

FIELD OF THE DISCLOSURE

Embodiments of the present disclosure generally relate to friction stir welding two work pieces together to form a welded joint.

BACKGROUND OF THE DISCLOSURE

Some industrial applications require elongated metal structures. For example, aircraft manufacturers use elongated metal structures for passenger aircraft. These elongated metal structures can be up to or even greater than 40 feet in length. However, it is difficult to fabricate long, thin metal structures that achieve relatively tight dimensional tolerances and that provide desired strength and stiffness characteristics. One conventional fabrication process involves extruding metal into a desired shape, but the long, thin extrusions tend to experience distortion, such as twisting or bowing. It is exceedingly difficult to extrude thin, elongated hollow structures that provide desired strength and rigidity, and meet the tight dimensional tolerances. Furthermore, some applications may require certain metal compositions for the elongated metal structure that are inherently difficult to extrude. Another conventional fabrication process is fusion welding. However, fusion welding is not a realistic option for some material compositions due to undesirable reactions in the microstructure due to the extreme change in temperature which degrades the material properties. For example, high strength aluminum alloy elongated structures may not be fabricated by fusion welding due to the aluminum alloy forming post-weld cracks. To accommodate these fabrication issues, some elongated metal structures may be thicker and heavier than desired, which adds cost and weight to the aircraft or other application.

SUMMARY OF THE DISCLOSURE

A need exists for a friction stir welding (FSW) tool and method that is able to reliably and repeatably produce a mechanically strong and stiff elongated metal structure that has thin walls. For example, the elongated metal structure may be composed of a high-strength aluminum alloy that is difficult to extrude and fusion weld. The thin walls may reduce material costs and weight, relative to bulkier elongated structures. The reduced weight may be particularly advantageous for aircraft applications.

With those needs in mind, certain embodiments of the present disclosure provide a friction stir welding (FSW) tool that includes a pin, a housing, and a shoulder. The pin is configured to extend through a joint line between edges of two work pieces. The pin rotates to perform a FSW process that welds the two work pieces together at the joint line. The housing is coupled to a distal end of the pin to enable rotation of the pin relative to the housing. The pin extends through a support surface of the housing. The support surface contacts respective inner surfaces of the work pieces during the FSW process. The shoulder surrounds the pin and is configured to be rotated during the FSW process. The shoulder contacts respective outer surfaces of the work pieces during the FSW process such that the work pieces are sandwiched between the shoulder and the support surface of the housing.

Certain embodiments of the present disclosure provide a welding method that includes loading a FSW tool onto two elongated work pieces fixed in position relative to one another such that respective edges of the work pieces define a joint line therebetween. The FSW tool includes a pin that extends through the joint line, a housing coupled to a distal end of the pin, and a shoulder that surrounds the pin. The FSW tool is loaded such that the housing is disposed along a first side of the joint line and the shoulder is disposed along a second side of the joint line opposite the first side. The method includes performing a FSW process by at least rotating the pin and moving the FSW tool along a length of the joint line to form a welded joint.

Certain embodiments of the present disclosure provide a welding assembly that includes a structure and a friction stir welding (FSW) tool. The structure is defined by two elongated work pieces fixed in place relative to each other. The structure includes a joint line defined between respective edges of the two elongated work pieces. The structure includes a cavity that extends a length of the joint line. The FSW tool includes a housing disposed within the cavity, a pin extending through the joint line and coupled to the housing, and a shoulder disposed outside of the cavity and surrounding the pin. The pin is configured to rotate relative to the housing and the joint line to perform a FSW process that welds the two elongated work pieces together at the joint line. The shoulder is configured to rotate relative to the housing and the joint line during the FSW process.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 3 is a perspective view of the FSW tool 12 according to an embodiment.

FIG. 4 is an elevation view of the FSW device shown in FIG. 3.

FIG. 5 is a cross-sectional view of the FSW tool shown in FIG. 3.

DETAILED DESCRIPTION OF THE DISCLOSURE

Figure 1:
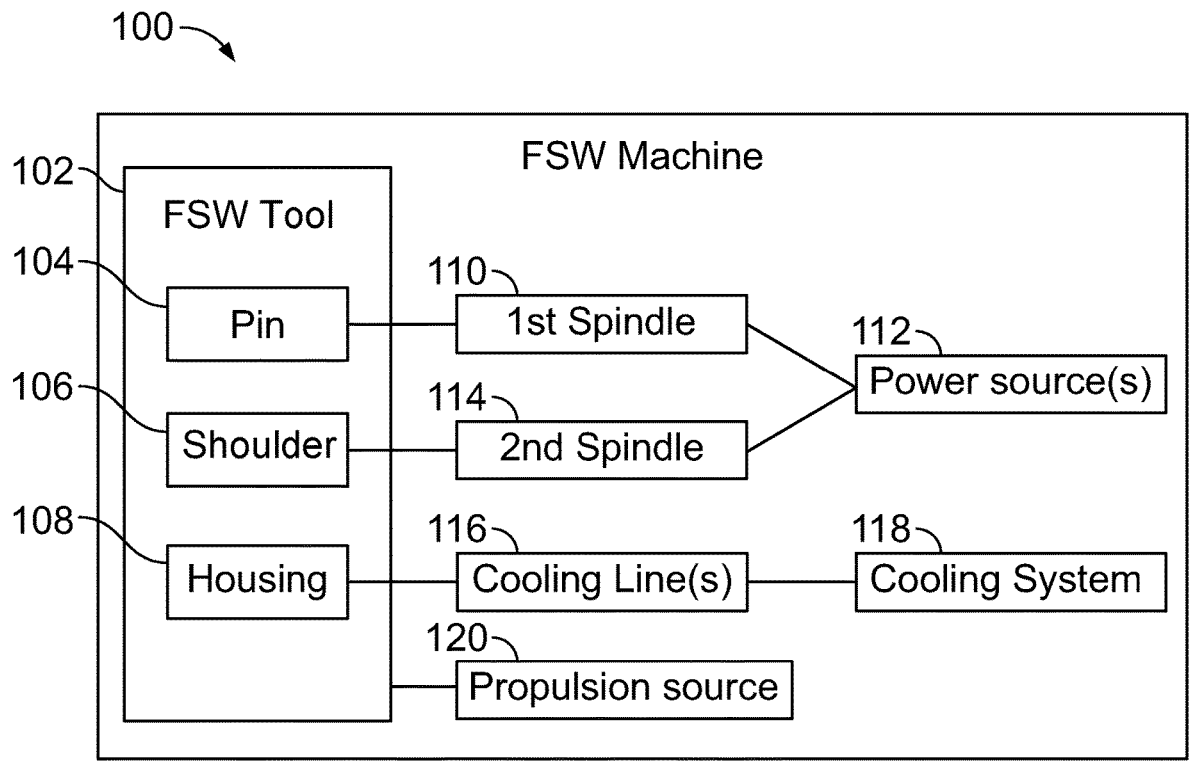
FIG. 1 is a block diagram of a friction stir welding (FSW) machine according to an embodiment.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a method and tool for performing friction stir welding (FSW) to secure two elongated work pieces together along a joint. The work pieces may be metal. For example, the work pieces may be metal extrusions. The tool includes a pin that is coupled to a housing and extends from the housing. The pin is designed to extend through a joint line defined between opposing edges of the two work pieces. The tool includes a shoulder that surrounds a portion of the pin such that the joint line is between the shoulder and the housing. The pin and shoulder rotate relative to the housing and the work pieces. The rotation of the pin and shoulder exerts a frictional force on the work pieces, which heats the edges to a plastic state, below the melting point of the work pieces. The edges mix together when in the plastic, malleable state, and form a welded joint upon cooling and solidifying to integrally join the two work pieces. The product of the welding process is a weld structure.

The FSW tool and method described herein may be used to fabricate weld structures that are both strong and lightweight. The strength may be attributable to the material composition and/or structural design of the weld structure. For example, the FSW tool and method may be used to weld two work pieces composed of a high strength metal alloy. Some high strength metal alloys are not able to be welded by fusion due to the formation of defects, such as cracks. The FSW tool and method may be applicable with at least some of these "unweldable" alloys, such as high-strength aluminum alloys. The structural design of the weld structures may contribute to the strength based on the arrangement of interconnected walls. For example, the work pieces in one or more embodiments described herein may be arranged to define an elongated, hollow box shape that extends the length of the work pieces. The hollow box may structurally support the shape of the weld structure, increasing the stiffness and strength of the weld structure relative to a structure that lacks an internal hollow box element. One advantage of the strength of the weld structure is that the walls of the weld structure can be relatively thin while still maintaining a designated strength parameter (e.g., stiffness, etc.). The walls of the weld structures described herein may be thinner than other known structures in the same or similar applications, which reduces material costs and weight. Providing a reduced weight structure is particularly beneficial for aerial applications, such as commercial aircraft. The structure formed using the FSW tool and method described herein may have better quality (e.g., better surface finish, better dimensional accuracy, less deformation, less defects, and/or the like) than other techniques for fabricating elongated structures, such as extruding the structure in its final shape, without welding.

In one example, the weld structure that is formed by friction stir welding two work pieces is a track. For example, the weld structure may be a seat track on a vehicle for securing passenger seats in place within the vehicle. The vehicle may be a road-based vehicle (e.g., bus, truck, van, etc.), an aerial vehicle (e.g., aircraft, helicopter, spacecraft, etc.), a rail-based vehicle (e.g., train), a marine vessel (e.g., cruise ship, yacht, etc.), or the like. For example, multiple passenger seats may be secured to the seat track within a passenger cabin of the vehicle. In a specific example, the FSW device and method described herein may be designed to fabricate a seat track for an aircraft. The embodiments described herein are not limited to aircraft applications, and are not limited to seat tracks. The FSW device and method may be applied to form various different types of elongated structures for different vehicular and/or non-vehicular applications.

FIG. 1 is a block diagram of a friction stir welding (FSW) machine 100 according to an embodiment. The FSW machine 100 includes a FSW tool 102, which is a tool that engages the work pieces to perform a FSW process and combine the work pieces at a welded joint. The FSW tool 102 includes a pin 104, a shoulder 106, and a housing 108. The pin 104 is mechanically connected (e.g., coupled) to an actuator that rotates the pin 104 during the FSW process. In an example, the FSW tool 102 may be a self-reacting type of FSW tool. The FSW tool 102 may include two opposing components that contain the pin 104 in a single assembly and move together along the length of the work pieces to create the weld. For example, the work pieces may be sandwiched between the shoulder 106 and a top surface of the housing 108. The pin 104 may extend through the joint during the welding process.

In the illustrated embodiment, the actuator includes a first spindle 110 that is powered by one or more power sources 112 to rotate the pin 104. The power source(s) 112 may include a motor, a battery, a pneumatic tank that includes compressed gas, a hydraulic pump, and/or the like. For example, the power source(s) 112 may be controlled based on control signals generated by a user input device that controls operation of the FSW machine 100. The spindle 110 and power source(s) 112 may control the rate at which the pin 104 rotates, and may vary the rate based on received control signals.

The housing 108 is coupled to the pin 104. For example, a distal segment of the pin 104 may extend into the housing 108. The pin 104 may rotate relative to the housing 108 (and the work pieces) during the FSW process. In an embodiment, the housing 108 does not rotate relative to the work pieces during the FSW process. For example, the housing 108 does not complete a full 360-degree rotation. In the illustrated embodiment, the shoulder 106 is mechanically connected (e.g., coupled) to a second actuator that rotates the shoulder 106 during the FSW process. For example, the second actuator may include a second spindle 114 that is powered by the one or more power sources 112 to rotate the shoulder 106. Optionally, the rotation of the shoulder 106 may be independent of the rotation of the pin 104. In an example, the pin 104 may rotate at different times, a different direction, and/or a different rate than the shoulder 106. In one setting, the shoulder 106 and the pin 104 may be controlled to concurrently rotate at the same rate (e.g., speed) and direction. In an alternative embodiment, the shoulder 106 may not be rotated during the FSW process. In that case, the pin 104 rotates relative to the shoulder 106, the housing 108, and the work pieces.

Optionally, the housing 108 of the FSW tool 102 may be connected to one or more cooling lines 116 which convey a coolant to and/or from the housing 108 to dissipate heat from the FSW tool 102. The heat may be generated from the frictional forces exerted by the FSW tool 102 on the work pieces and/or frictional forces between moving components within the FSW tool 102 itself. The coolant may be a fluid, such as a glycol solution. The coolant may be pumped through the cooling line(s) 116 via a cooling system 118. Optionally, the FSW machine 100 may include a first cooling line that delivers the coolant to the housing 108 from the cooling system 118, and a second cooling line that returns the coolant from the housing 108 to the cooling system 118. The cooling line(s) 116 may be hoses, tubes, or the like. In a first alternative embodiment, the FSW machine 100 lacks the cooling system 118 and coolant, and the cooling line(s) 116 are metal rods that passively conduct heat away from the housing 108. In a second alternative embodiment, the FSW machine 100 may lack both the cooling system 118 and cooling line(s) 116.

Figure 2:
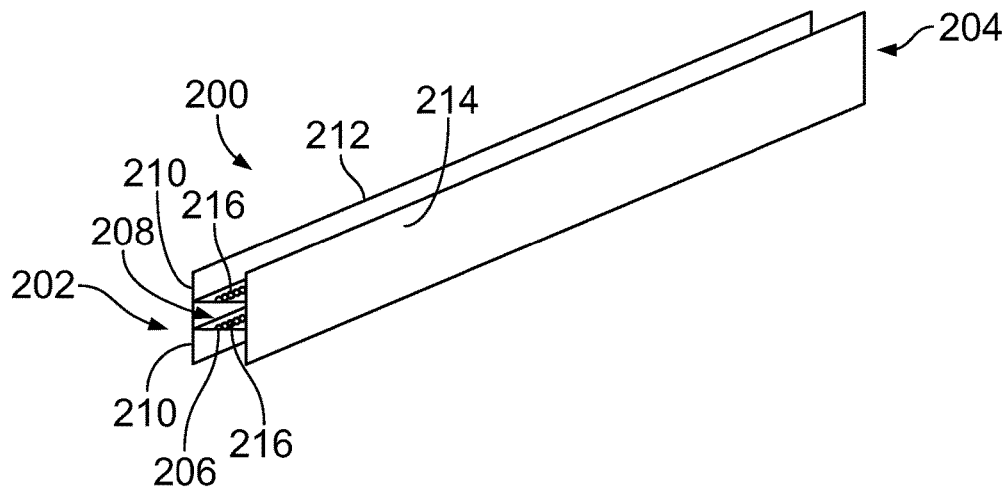
FIG. 2 is a perspective view of a weld structure that is formed by the FSW machine according to an embodiment.

FIG. 2 is a perspective view of a weld structure 200 that is formed by the FSW machine 100 according to an embodiment. The weld structure 200 (also referred to herein as structure 200) is elongated and extends from a first end 202 of the structure 200 to a second end 204 of the structure 200, which is opposite the first end 202. The structure 200 may be linear along the length between the first and second ends 202, 204. The structure 200 may include a box-shaped portion 206 that defines an elongated cavity 208. The elongated cavity 208 may extend the entire length of the structure 200. The structure 200 may include one or more wing segments 210 that project from the box-shaped portion 206. The wing segments 210 may extend the length of the structure 200. In the illustrated embodiment, the structure 200 has four wing segments 210. This cross-sectional shape of the structure 200 is enlarged in FIG. 7. The structure 200 may not be shown to scale in FIG. 2. For example, the length of the structure 200 may be up to, or greater than, 20 feet, 40 feet, or the like. The walls of the box-shaped portion 206 and/or the wing segments 210 may be relatively thin. In an example, the thickness may be no greater than 0.25 inches, or even no greater than 0.125 inches. The structure 200 may have other cross-sectional shapes in other embodiments.

The FSW machine 100 may weld two work pieces together to form the structure 200. For example, a first work piece 212 and a second work piece 214 may be positioned relative to one another such that edges of the work pieces 212, 214 define one or more seams, referred to herein as joint lines 216. The work pieces 212, 214 may be fixed in place via one or more fixtures. The structure 200 has two joint lines 216 in the illustrated embodiment. The joint lines 216 may extend the length of the structure 200. During the FSW process, the FSW tool 102 may travel along the length of the work pieces 212, 214, forming weld joints at the joint lines to integrally connect the two work pieces 212, 214 together and define the unitary weld structure 200 shown in FIG. 2.

Referring back to FIG. 1, in an embodiment, the FSW machine 100 may include a propulsion source 120 that moves the FSW tool 102 along the length of the work pieces 212, 214 during the FSW process. The propulsion source 120 may include a powered actuator, a robotic arm, a tool on a suspended track that pulls the FSW tool 102, a traction motor that powers rotation of wheels on the FSW tool 102 to drive along the work pieces 212, 214, and/or the like. The propulsion source 120 may control the movement of the FSW tool 102 during the FSW process at a designated and constant speed. The designated speed may be based on welding conditions to ensure that the FSW tool 102 provides sufficient attention to each section of the joint line to result in a successfully welded joint that is relatively uniform along the length. The welding conditions may include the rotational speed of the pin 104, the material properties of the work pieces 212, 214, the amount of heat dissipation by the coolant, and/or the like. In an alternative embodiment, the FSW tool 102 may be manually pushed or pulled along the length of the joint lines 216 by a human operator during the FSW process.

FIG. 3 is a perspective view of the FSW tool 102 according to an embodiment. FIG. 4 is an elevation view of the FSW tool 102 shown in FIG. 3. FIG. 5 is a cross-sectional view of the FSW tool 102 shown in FIG. 3. The cross-section in FIG. 5 is taken along line 5-5 in FIG. 3. The following description collectively refers to FIGS. 3 through 5.

The pin 104 is linear and extends from a proximal end 302 of the pin 104 to a distal end 304 of the pin 104 that is opposite the proximal end 302. The pin 104 rotates about a central axis 306 that extends through the pin 104 and is parallel with a length of the pin 104 between the proximal and distal ends 302, 304. A proximal segment 308 of the pin 104 connects to the first spindle 110 (or another type of actuator assembly that rotates the pin 104. The proximal segment 308 may include helical threads 310. A distal segment 312 of the pin 104 connects to the housing 108. As shown in FIG. 5, the distal segment 312 may extend into the housing 108. The distal end 304 optionally may be within the housing 108 or may project beyond a bottom side 314 of the housing 108. The distal segment 312 may include helical threads or another feature for securing the pin 104 to the housing 108. The pin 104 projects from a top side 316 of the housing 108 such that the proximal segment 308 and the proximal end 302 are outside of the housing 108. In an embodiment, a majority of the length of the pin 302 is outside of the housing 108. The pin 104 may be composed of a high-strength metal material.

The shoulder 106 surrounds the pin 104. The shoulder 106 may be shorter than the pin 104 such that the shoulder 106 surrounds only a section of the pin 104. The shoulder 106 may be a hollow shell as shown in FIG. 5. The shoulder 106 may be coaxial with the pin 104, and may rotate about the pin 104 (e.g., about the central axis 306). The shoulder 106 may be cylindrical. The shoulder 106 may not be directly connected to the housing 108. For example, during the FSW process, the shoulder 106 may be spaced apart from the housing 108 and may contact a different surface of the work pieces 212, 214 than the surface contacted by the housing 108, as described with reference to FIG. 7. The shoulder 106 may be composed of a metal material. The material composition of the shoulder 106 may be the same or different from the composition of the pin 104.

In an example, the housing 108 is box-shaped. The housing 108 includes the top side 316, the bottom side 314, a first side wall 318, a second side wall 320, a first end wall 322, and a second end wall 324. The housing 108 may be an assembly of multiple components. For example, the housing 108 may include a body 326 that defines the end walls 322, 324, or at least portions of the end walls 322, 324. A lower plate 328 may define at least a portion of the bottom side 314. An upper plate 330 may define at least a portion of the top side 316. The first and second side walls 318, 320 may be defined by wear pads 332. The body 326, upper plate 330, lower plate 328, and wear pads 332 may be secured together via fasteners 334. The housing 108 may have different components in alternative embodiments. In an alternative embodiment, the housing 108 may include the body 326 and the wear pads 332 without the discrete upper and lower plates 330, 328 because the body 326 may be formed to provide the functions of the plates 330, 328. For example, a top surface of the body 326 may provide back side weld containment, and a portion of the body 326 may block the internal bearing from falling out of the housing 108.

Figure 6:
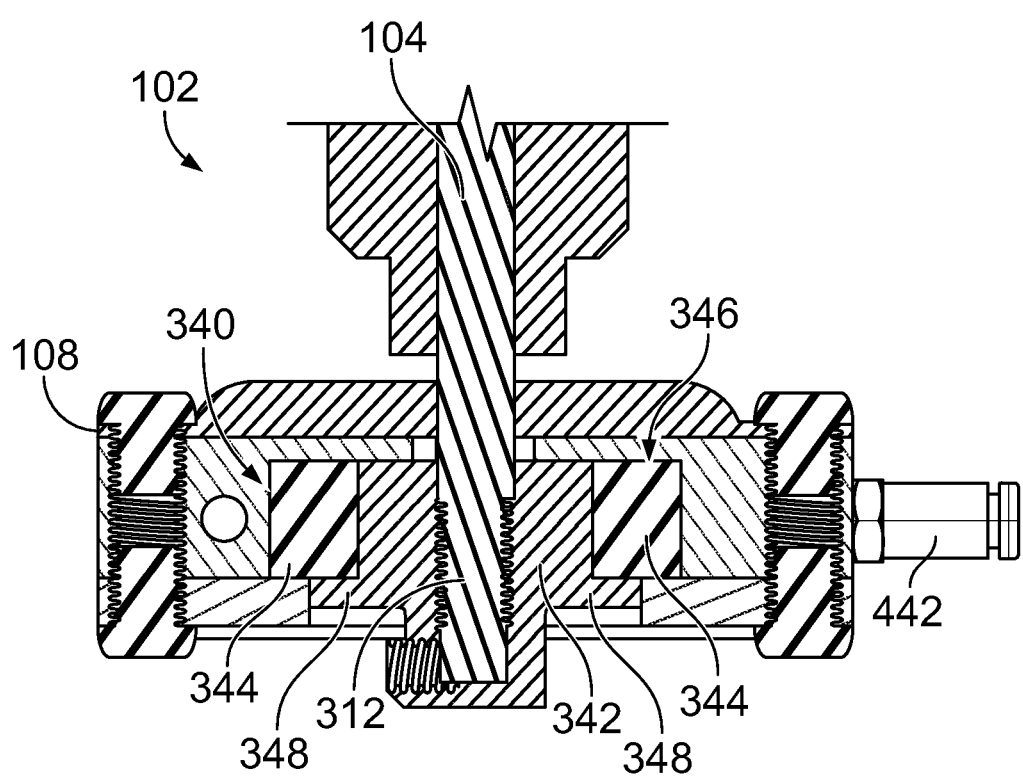
FIG. 6 is an enlarged cross-sectional view of a portion of the FSW tool shown in FIG. 5.

FIG. 6 is an enlarged cross-sectional view of a portion of the FSW tool 102 shown in FIG. 5. In an embodiment, the distal segment 312 of the pin 104 is connected to a bearing assembly 340 within the housing 108. The bearing assembly 340 enables the pin 104 to rotate relative to the housing 108 while remaining mechanically connected to the housing 108.

The bearing assembly 340 may include a bushing 342 that is fixedly secured to the pin 104. For example, the distal segment 312 may screw into the bushing 342 and may be retained in the bushing 342 via a set screw or the like. The bearing assembly 340 may include a track or race 344 that is annular and surrounds a portion of the bushing 342. The race 344 contacts the bushing 342 and enables the bushing 342 to rotate relative to the race 344 with low friction. The race 344 may include ball bearings. The bearing assembly 340 is incorporated within an interior 346 of the housing 108. The bearing assembly 340 enables the pin 104 to rotate without forcing the housing 108 to rotate. In an embodiment, the housing 108 does not rotate relative to the work pieces during the FSW process. The bearing race 344 may be mounted in place within a depression or cavity of the body 326 that is sized to accommodate the race 344. The bushing 342 may have a flange 348 that contacts a bottom side of the race 344 or the body 326 to retain the bushing 342 within the race 344.

Figure 7:
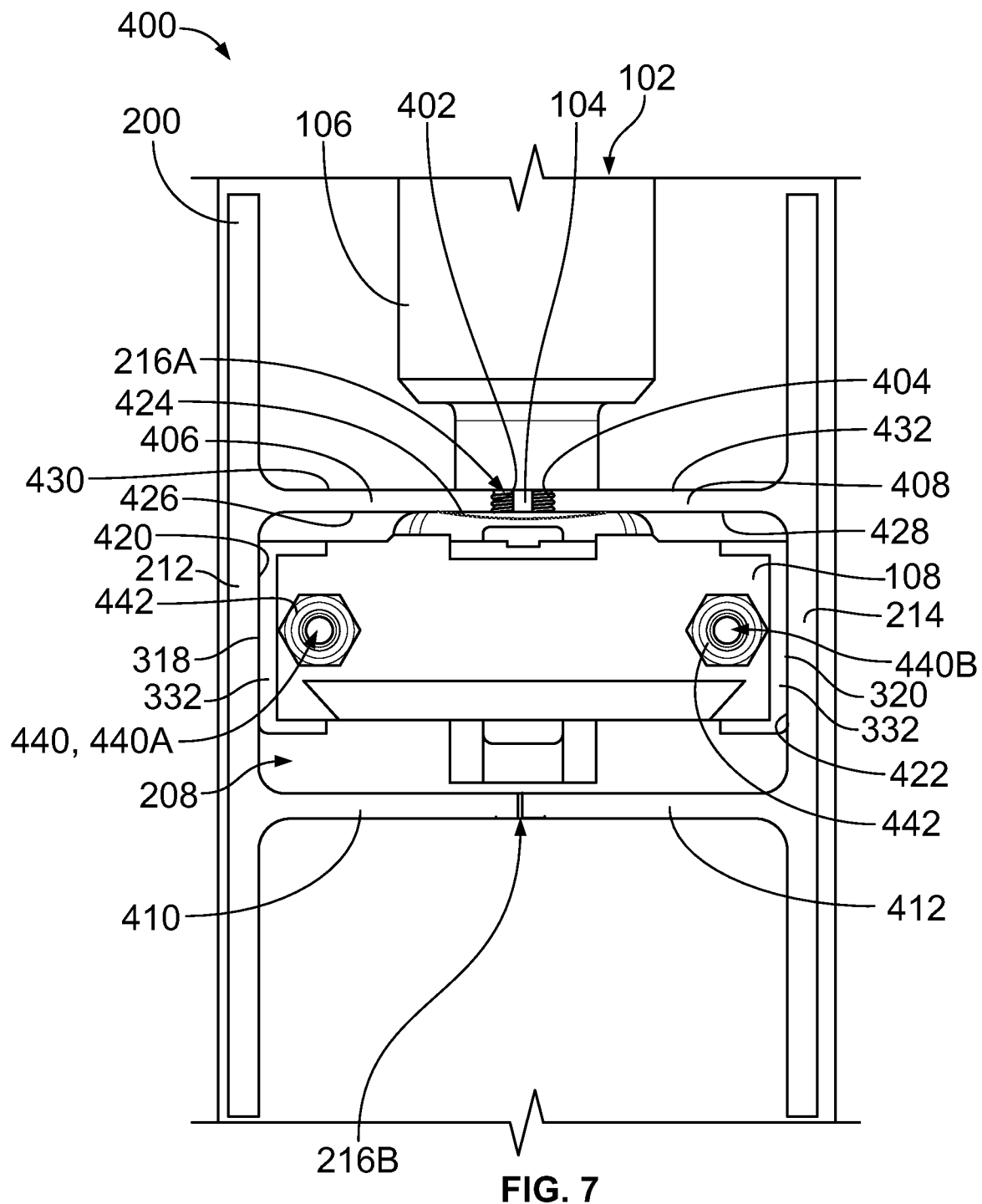
FIG. 7 is an elevation view of a welding assembly that includes the FSW tool and the weld structure according to an embodiment.

FIG. 7 is an elevation view of a welding assembly 400 that includes the FSW tool 102 and the weld structure 200 according to an embodiment. FIG. 7 shows the FSW tool 102 performing the FSW process on the work pieces 212, 214 that define the weld structure 200 according to an embodiment. For example, the FSW tool 102 is positioned to weld a first joint line 216A that is defined by opposing edges 402, 404 of respective first flanges 406, 408 of the work pieces 212, 214. In the illustrated embodiment, the first and second work pieces 212, 214 are replica copies of each other. For example, the work pieces 212, 214 may have shapes that resemble the shape of the Greek letter Pi. The work pieces 212, 214 may also define a second joint line 216B that is across the elongated cavity 208 from the first joint line 216A. The FSW tool 102 is not positioned to weld the second joint line 216B in the illustrated orientation. The second joint line 216B is defined between edges of second flanges 410, 412 of the first and second work pieces 212, 214. The FSW tool 102 may be flipped relative to the structure 200 to weld the second joint line 216B. Alternatively, a second FSW tool 102 may be used in conjunction with the illustrated FSW tool 102 to weld the second joint line 216B, such as by moving the two FSW tools 102 in sequence with one in front of the other along the length of the structure 200. At least one of the work pieces 212, 214 may have a different shape in an alternative embodiment.

The housing 108 of the FSW tool 102 may be sized and shaped to fit within the elongated cavity 208 of the structure 200. For example, the housing 108 is disposed within the elongated cavity 208 in FIG. 7. The pin 104 is coupled to the housing 108 and extends through the first joint line 216A. The shoulder 106 is disposed outside of the elongated cavity 208. In an embodiment, the pin 104 is rotated during the FSW process and contacts the edges 402, 404 of the first flanges 406, 408 at the first joint line 216A. The friction between the pin 104 and the edges 402, 404 heats the edges 402, 404 and welds the two first flanges 406, 408 of the work pieces 212, 214 together at the first joint line 216A. In an embodiment, the shoulder 106 is rotated during the FSW process, concurrently with the rotation of the pin 104.

The pin 104 and the shoulder 106 may rotate relative to the housing 108 and the joint line 216A, which are held stationary. For example, the housing 108 may not be physically able to rotate within the elongated cavity 208. One or both of the side walls 318, 320 of the housing 108 may contact corresponding side surfaces 420, 422 of the elongated cavity 208. For example, the side wall 318 may contact the side surface 420 of the first work piece 212, and the side wall 320 may contact the side surface 422 of the second work piece 214. In an embodiment, the side walls 318, 320 are defined by the wear pads 332. The wear pads 332 may be designed to slide along the corresponding side surfaces 420, 422 with limited friction to reduce drag and/or low abrasion to avoid damaging the surface quality of the work pieces 212, 214. The wear pads 332 may be composed of nylon, high density plastic, or the like. The wear pads 332 may be replaceable.

In an embodiment, the flanges 406, 408 of the work pieces 212, 214 may be sandwiched between the shoulder 106 and the housing 108 during the FSW process. The housing 108 may include a support surface 424 that contacts respective inner (or lower) surfaces 426, 428 of the flanges 406, 408. The surfaces 426, 428 are inner surfaces because they face inside the elongated cavity 208. The support surface 424 of the housing 108 may provide a base that prevents the deformable edges 402, 404 along the joint line 216A from drooping due to gravity and/or other forces. The support surface 424 may be smooth. The welded joint may conform to the smooth shape of the support surface 424, resulting in a smooth surface finish along the inner surface of the welded joint.

The shoulder 106 may contact respective outer (or upper) surfaces 430, 432 of the flanges 406, 408 during the FSW process. For example, the shoulder 106 may be able to slide along the length of the pin 104. The shoulder 106 may be biased towards the flanges 406, 408 due to gravitational force. Alternatively, a biasing member, such as a spring, may exert a biasing force on the shoulder 106 towards the flanges 406, 408. The compressive forces provided by the shoulder 106 and the housing 108 may provide a desired shape and surface finish at the weld joint. A distal end 434 of the shoulder 106 may contact and slide along the outer surfaces 430, 432 as the shoulder 106 rotates during the FSW process. The friction provided by the active rotation of the shoulder 106 may enhance the quality of the surface finish.

In an embodiment, the housing 108 includes at least one port 440 that extends into the interior of the housing 108. The port 440 may be fluidly connected to one or more cooling channels that extend through the interior of the housing 108. The cooling channels may extend proximate to the bearing assembly 340 shown in FIG. 6. The cooling channels may be defined through the body 326 of the housing 108. The port 440 may receive a coolant that absorbs heat from the housing 108. The housing 108 includes a first port 440A and a second port 440B in the illustrated embodiment. Both ports 440A, 440B are disposed along a common end wall 322 of the housing 108 in FIG. 7. The ports 440A, 440B are spaced apart along a width of the housing 108. In alternative embodiments, the housing 108 may include a different number of ports and/or at least some of the ports may be disposed on different end walls of the housing 108. In an embodiment, a respective fitting 442 is installed within each port 440. The fitting 442 may be a quick connect fitting. The fitting 442 is configured to connect to a corresponding cooling line 116 (shown in FIG. 1).

Figure 8:
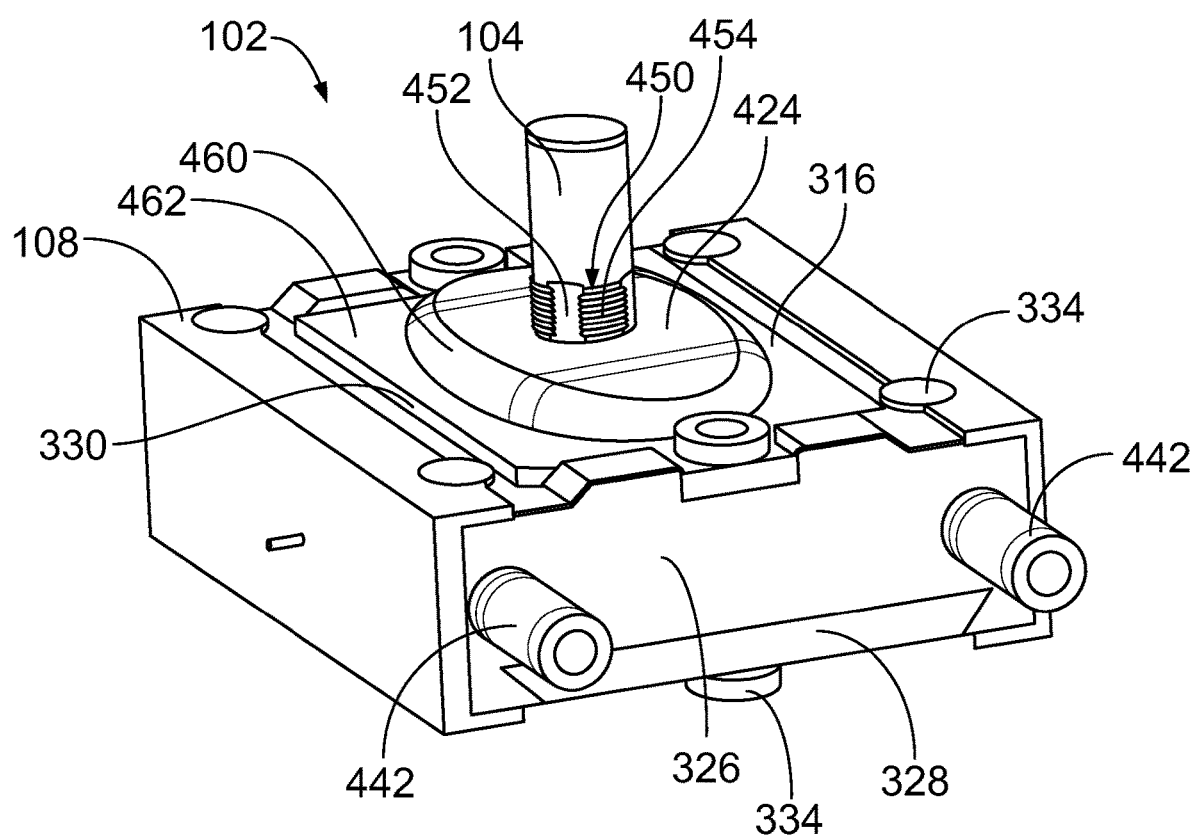
FIG. 8 is a perspective view of the FSW tool shown without the shoulder.

FIG. 8 is a perspective view of the FSW tool 102 shown without the shoulder 106. The segment of the pin 104 that aligns with and contacts the work pieces 212, 214 during the FSW process may have a non-uniform surface 450. The non-uniform surface 450 may include undulations, ridges, serrations, and/or the like. Optionally, the non-uniform surface 450 may include smooth portions 452 and undulating portions 454 that alternate around a circumference of the pin 104.

In an embodiment, the housing 108 includes a raised platform 460 that protrudes beyond an upper surface 462 of the top side 316. The raised platform 460 defines the support surface 424 that contacts and supports the flanges 406, 408 during the FSW process. The raised platform 460 may have an elliptical, anvil shape. The raised platform 460 may be centrally located along the top side 316 of the housing 108, and is offset from a surrounding area of the top side 316. The pin 104 extends through the raised platform 460. In the illustrated embodiment, the raised platform 460 is a component of the upper plate 330. In an alternative embodiment, the body 326 of the housing 108 may define the raised platform 460. The support surface 424 on the raised platform 460 may be relatively planar. For example, the support surface 424 may be planar proximate to the pin 104, and may taper or curve along radial edges of the raised platform 460. In an alternative embodiment, the housing 108 does not include the raised platform 460. For example, the support surface 424 may be defined by a central area of the top side 316 of the housing 108 that is flush with, or recessed below, a surrounding area of the top side 316.

Optionally, the body 326 may define a dovetail interface 470 with the lower plate 328 of the housing 108. The lower plate 328 may be assembled by sliding into the body 326 at the dovetail interface 470. The fasteners 334 may secure the lower plate 328 in place.

Figure 9:
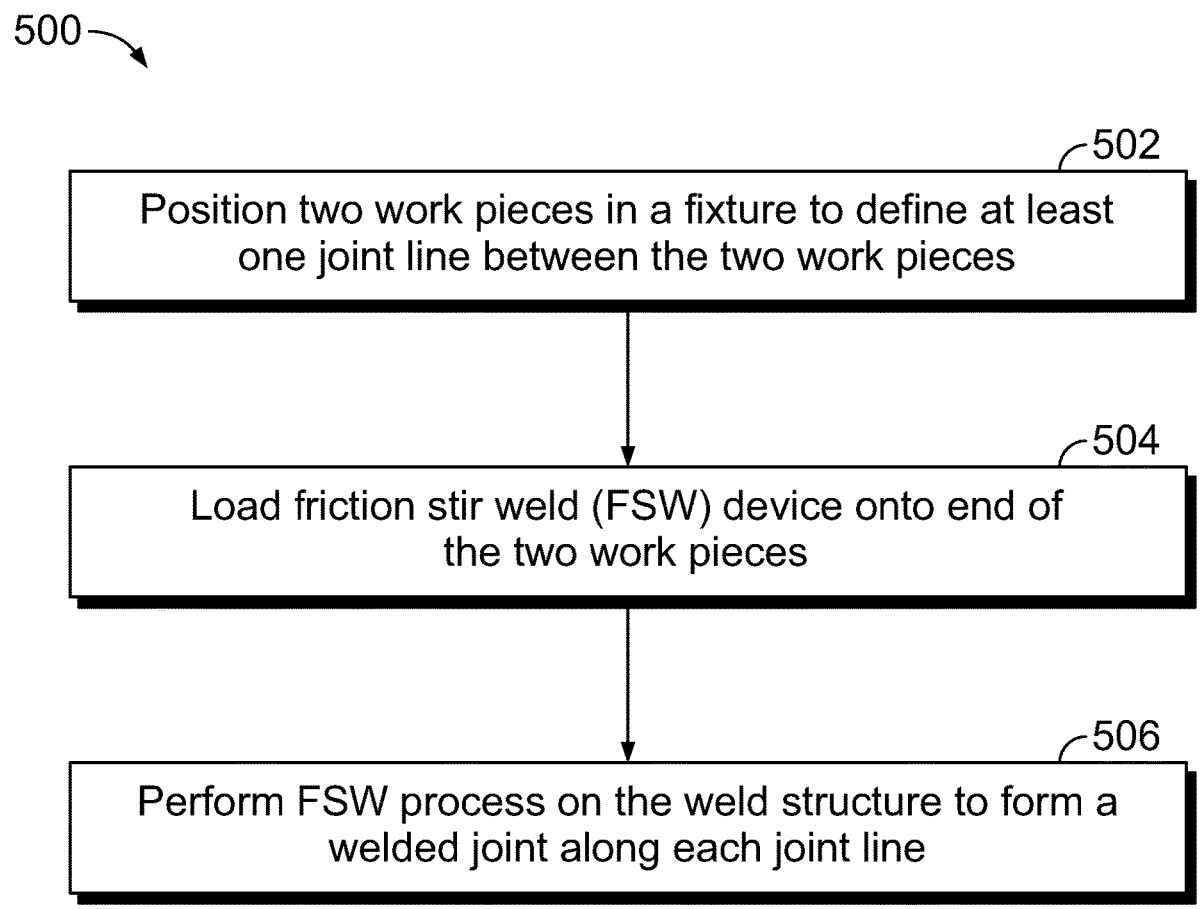
FIG. 9 is a flow chart of a welding method according to an embodiment.

FIG. 9 is a flow chart 500 of a welding method according to an embodiment. The welding method may be a friction stir welding process. The welding method may be performed using the FSW machine 100 shown in FIG. 1. The method may be performed to weld two extruded, elongated work pieces together to form a unitary, one-piece weld structure. The weld structure may be relatively strong, stiff, and lightweight. The method optionally may include at least one additional step than shown, at least one fewer step than shown, and/or at least one different step than shown in FIG. 9.

At step 502, two elongated work pieces 212, 214 are positioned in a fixture 480 to secure the work pieces 212, 214 in fixed positions relative to one another. The work pieces 212, 214 may be oriented in the fixture 480 such that edges 402, 404 of first flanges 406, 408 of the work pieces 212, 214 oppose one another and define a joint line 216. The joint line 216 may extend a length of the elongated work pieces 212, 214.

At step 504, a FSW tool or tool 102 is loaded onto the two elongated work pieces 212, 214 held in the fixture 480. The FSW tool 102 may be mounted to a combined end segment of the two work pieces 212, 214 at one of the ends. The FSW tool 102 may be loaded onto the work pieces 212, 214 such that a pin 104 of the FSW tool 102 extends through the joint line 216, a housing 108 of the FSW tool 102 is disposed along a first side of the joint line 216, and a shoulder 106 of the FSW tool 106 is disposed along a second side of the joint line 216 opposite the first side. Optionally, the end of the of the work pieces 212, 214 may include a pre-formed slot that aligns with the joint line 216 and accommodates the pin 104. The pre-formed slot enables setting up the FSW tool 102 in a designated position prior to rotating the pin 104.

In an embodiment, the two elongated work pieces 212, 214 in the fixture 480 define an elongated cavity 208 that extends a length of the work pieces 212, 214. The cavity 208 may be defined by four walls with open ends. The joint line 216 extends through one of the four walls. Optionally, a second joint line 216 extends through another wall of the four walls. Loading the FSW tool 102 onto the two elongated work pieces at step 504 may include positioning the housing 108 within the elongated cavity 208. The housing 108 of the FSW tool 102 may be sized relative to the cavity 208 such that corresponding side surfaces 420, 422 of the work pieces 212, 214 block rotation of the housing 108 within the cavity 208.

At step 506, a FSW process is performed using the FSW tool 102. The FSW process may be performed at least in part by rotating the pin 104 and moving the FSW tool 102 along a length of the joint line 216 to form a welded joint. at the joint line 216. The FSW process may be performed by positioning the housing 108 such that a support surface 424 of the housing 108 contacts respective inner surfaces 426, 428 of the work pieces 212, 214 surrounding the pin 104 and the joint line 216. Performing the FSW process may include sandwiching opposing walls or flanges 406, 408 of the work pieces 212, 214 between a distal end 434 of the shoulder 106 and the support surface 424 of the housing 108. The FSW process may also include rotating the shoulder 106 relative to the housing 108 such that both the pin 104 and the shoulder 106 are rotated. In an embodiment, the shoulder 106 may be rotated independently of the pin 104. Optionally, the FSW process may include conveying a coolant to an interior of the housing 108 via a coolant line 116 that is connected to a port 440 of the housing 108. The coolant may absorb and dissipate heat from the FSW tool 102.

The work pieces 212, 214 optionally may define both first and second joint lines 216A, 216B that extend parallel to one another along the length of the structure 200. For example, the second joint line 216B may be located along an opposite side of the cavity 208 from the first joint line 216A. In an example, performing the FSW process may include forming a first welded joint along the first joint line 216A during a first time period by moving the FSW tool 102 along the length of the structure 200 with the pin 104 extending through the first joint line 216A. Then, the method 500 may include reorienting the FSW tool 102 relative to the work pieces 212, 214 (after forming the first welded joint). The FSW tool 102 may be reoriented such that the pin 104 extends through the second joint line 216B. For example, the FSW tool 102 may be flipped 180 degrees relative to the orientation of the work pieces 212, 214 in the fixture 480. The FSW process may include making a second pass of the FSW tool 102 along the length of the structure 200 to form a second welded joint at the second joint line 216B.

In another example in which the two work pieces 212, 214 define the two joint lines 216A, 216B, the method may include utilizing two different FSW tools 102 to each form one of the two welded joints. For example, a second FSW tool 102 may be loaded onto the work pieces 212, 214 next to the first FSW tool 102. This may include loading the two FSW tools 102 end-to-end within the elongated cavity 208 such that the second FSW tool trails the first FSW tool. The two FSW tools 102 may be copies or replicas of each other, such that the tools have the same components. The FSW machine 100 may be equipped with another set of spindles to simultaneously weld opposite joints.

In the illustrated embodiment shown in FIGS. 7 and 9, the two FSW tools may be flipped 180 degrees relative to one another. The pin 104 of the first FSW tool extends through the first joint line 216A, and the pin 104 of the second FSW tool extends through the second joint line 216B. The FSW process may be performed by rotating the pin 104 of the first FSW tool, rotating the pin 104 of the second FSW tool, moving the first FSW tool along the length of the first joint line 216A in a first direction to form the welded joint, and moving the second FSW tool along the length of the second joint line in the first direction to form a second welded joint.

The first and second FSW tools may be concurrently moved with the second FSW tool trailing the first FSW tool.

Clause 1: A friction stir welding (FSW) tool comprising:
a pin configured to extend through a joint line between edges of two work pieces and to rotate to perform a FSW process that welds the two work pieces together at the joint line;
a housing coupled to a distal end of the pin to enable rotation of the pin relative to the housing, the pin extending through a support surface of the housing, the support surface contacts respective inner surfaces of the work pieces during the FSW process; and
a shoulder that surrounds the pin and is configured to be rotated during the FSW process, the shoulder contacting respective outer surfaces of the work pieces during the FSW process such that the work pieces are sandwiched between the shoulder and the support surface of the housing.

Clause 2: The FSW tool of Clause 1, wherein the housing includes a top side and a raised platform that protrudes beyond an upper surface of the top side, wherein the support surface is disposed along the raised platform.

Clause 3: The FSW tool of Clause 1 or Clause 2, wherein the shoulder is coaxial with the pin and configured to be rotated about the pin to perform the FSW process.

Clause 4: The FSW tool of any of Clauses 1-3, wherein the distal end of the pin is coupled to a bearing assembly within an interior of the housing.

Clause 5: The FSW tool of any of Clauses 1-4, wherein the housing includes first and second side walls configured to contact corresponding side surfaces of an elongated cavity defined by the two work pieces during the FSW process.

Clause 6: The FSW tool of Clause 5, wherein the first and second side walls include wear pads that contact the corresponding side surfaces.

Clause 7: The FSW tool of any of Clauses 1-6, wherein the housing is box-shaped and is sized to fit within an elongated cavity defined by the two work pieces.

Clause 8: The FSW tool of any of Clauses 1-7, wherein the housing includes at least a first port extending through an end wall of the housing and configured to receive a coolant to dissipate heat.

Clause 9: The FSW tool of Clause 8, further comprising a quick connect fitting installed within the first port and configured to connect to a cooling line that conveys the coolant.

Clause 10: The FSW tool of any of Clauses 1-9, further comprising a first spindle connected to the pin and a second spindle connected to the shoulder, wherein the first spindle rotates the pin relative to the housing and the work pieces during the FSW process, and the second spindle rotates the shoulder relative to the housing and the work pieces during the FSW process.

Clause 11: A welding method comprising:
loading a FSW tool onto two elongated work pieces fixed in position relative to one another such that respective edges of the work pieces define a joint line therebetween, the FSW tool including a pin that extends through the joint line, a housing coupled to a distal end of the pin, and a shoulder that surrounds the pin, wherein the FSW tool is loaded such that the housing is disposed along a first side of the joint line and the shoulder is disposed along a second side of the joint line opposite the first side; and
performing a FSW process by at least rotating the pin and moving the FSW tool along a length of the joint line to form a welded joint.

Clause 12: The welding method of Clause 11, wherein the edges of the work pieces are defined by opposing flanges of the work pieces, and performing the FSW process includes sandwiching the opposing flanges between a distal end of the shoulder and a support surface of the housing.

Clause 13: The welding method of Clause 11 or Clause 12, wherein performing the FSW process includes rotating the shoulder relative to the housing.

Clause 14: The welding method of any of Clauses 11-13, wherein performing the FSW process includes positioning the housing such that a support surface of the housing contacts respective inner surfaces of the work pieces surrounding the pin and the joint line.

Clause 15: The welding method of any of Clauses 11-14, wherein loading the FSW tool onto the two elongated work pieces comprises positioning the housing within a cavity defined by the work pieces that extends the length of the joint line.

Clause 16: The welding method of Clause 15, wherein the housing of the FSW tool is sized relative to the cavity such that corresponding side surfaces of the work pieces block rotation of the housing within the cavity.

Clause 17: The welding method of any of Clauses 11-16, further comprising conveying a coolant to an interior of the housing while performing the FSW process, the coolant conveyed via a coolant line that is connected to a port of the housing.

Clause 18: The welding method of any of Clauses 11-17, wherein the joint line is a first joint line, the welded joint is a first welded joint, and the work pieces define a second joint line therebetween that is parallel to and along an opposite side of a cavity from the first joint line, wherein performing the FSW process includes reorienting the FSW tool relative to the work pieces after forming the first welded joint and moving the FSW tool along the length of the second joint line to form a second welded joint.

Clause 19: The welding method of any of Clauses 11-18, wherein the FSW tool is a first FSW tool, the joint line is a first joint line, the welded joint is a first welded joint, and the work pieces define a second joint line therebetween that is parallel to and along an opposite side of a cavity from the first joint line, the method further comprising:
loading the second FSW tool onto the work pieces next to the first FSW tool such that a pin of the second FSW tool extends through the second joint line,
wherein performing the FSW process comprises rotating the pin of the first FSW tool, rotating the pin of the second FSW tool, moving the first FSW tool along the length of the first joint line in a first direction to form the welded joint, and moving the second FSW tool along the length of the second joint line in the first direction to form a second welded joint, wherein the first and second FSW tools are concurrently moved and the second FSW tool trails the first FSW tool.

Clause 20: A welding assembly comprising:
a structure defined by two elongated work pieces fixed in place relative to each other, the structure including a joint line defined between respective edges of the two elongated work pieces, the structure including a cavity that extends a length of the joint line; and
a friction stir welding (FSW) tool comprising:

a housing disposed within the cavity;

a pin extending through the joint line and coupled to the housing, the pin configured to rotate relative to the housing and the joint line to perform a FSW process that welds the two elongated work pieces together at the joint line; and a shoulder disposed outside of the cavity and surrounding the pin, the shoulder configured to rotate relative to the housing and the joint line during the FSW process.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A friction stir welding (FSW) tool comprising:

a pin configured to extend through a joint line between edges of two work pieces and to rotate to perform a FSW process that welds the two work pieces together at the joint line;

a housing coupled to a distal end of the pin to enable rotation of the pin relative to the housing, the pin extending through a support surface of the housing, the support surface contacts respective inner surfaces of the work pieces during the FSW process; and a shoulder that surrounds the pin and is coaxial with the pin, wherein the shoulder is slidable along a length of the pin and is biased towards the housing so that a distal end of the shoulder contacts respective outer surfaces of the work pieces and sandwiches the work pieces between the shoulder and the support surface of the housing during the FSW process, and wherein the shoulder is configured to be rotated independently of the pin during the FSW process for the distal end of the shoulder to slide along the outer surfaces of the work pieces.

2. The FSW tool of claim 1, wherein the housing includes a top side and a raised platform that protrudes beyond an upper surface of the top side, wherein the support surface is disposed along the raised platform.

3. The FSW tool of claim 1, wherein the distal end of the pin is coupled to a bearing assembly within an interior of the housing.

4. The FSW tool of claim 1, wherein the housing includes first and second side walls configured to contact corresponding side surfaces of an elongated cavity defined by the two work pieces during the FSW process.

5. The FSW tool of claim 4, wherein the first and second side walls include wear pads that contact the corresponding side surfaces.

6. The FSW tool of claim 1, wherein the housing is box-shaped and is sized to fit within an elongated cavity defined by the two work pieces.

7. The FSW tool of claim 1, wherein the housing includes at least a first port extending through an end wall of the housing and configured to receive a coolant to dissipate heat.

8. The FSW tool of claim 7, further comprising a quick connect fitting installed within the first port and configured to connect to a cooling line that conveys the coolant.

9. The FSW tool of claim 1, further comprising a first spindle connected to the pin and a second spindle connected to the shoulder, wherein the first spindle rotates the pin relative to the housing and the work pieces during the FSW process, and the second spindle rotates the shoulder relative to the housing and the work pieces during the FSW process.

10. A welding method comprising:

loading a FSW tool onto two elongated work pieces fixed in position relative to one another such that respective edges of opposing flanges of the work pieces define a joint line therebetween, the FSW tool including a pin that extends through the joint line, a housing coupled to a distal end of the pin, and a shoulder that surrounds the pin and is coaxial with the pin, wherein the FSW tool is loaded such that the housing is disposed along a first side of the flanges and the shoulder is disposed along a second side of the flanges opposite the first side, wherein the shoulder is slidable along a length of the pin and is biased towards the housing so that a distal end of the shoulder contacts respective outer surfaces of the flanges and sandwiches the flanges between the shoulder and the housing; and performing a FSW process by rotating the pin relative to the housing, rotating the shoulder relative to the housing, and moving the FSW tool along a length of the joint line to form a welded joint, wherein performing the FSW process includes rotating the shoulder relative to the pin.

11. The welding method of claim 10, wherein performing the FSW process includes positioning the housing such that a support surface of the housing contacts respective inner surfaces of the work pieces surrounding the pin and the joint line.

12. The welding method of claim 10, wherein loading the FSW tool onto the two elongated work pieces comprises positioning the housing within a cavity defined by the work pieces that extends the length of the joint line.

13. The welding method of claim 12, wherein the housing of the FSW tool is sized relative to the cavity such that corresponding side surfaces of the work pieces block rotation of the housing within the cavity.

14. The welding method of claim 10, further comprising conveying a coolant to an interior of the housing while performing the FSW process, the coolant conveyed via a coolant line that is connected to a port of the housing.

15. The welding method of claim 10, wherein the joint line is a first joint line, the welded joint is a first welded joint, and the work pieces define a second joint line therebetween that is parallel to and along an opposite side of a cavity from the first joint line, wherein performing the FSW process includes reorienting the FSW tool relative to the work pieces after forming the first welded joint and moving the FSW tool along the length of the second joint line to form a second welded joint.

16. The welding method of claim 10, wherein the FSW tool is a first FSW tool, the joint line is a first joint line, the welded joint is a first welded joint, and the work pieces define a second joint line therebetween that is parallel to and along an opposite side of a cavity from the first joint line, the method further comprising:

loading the second FSW tool onto the work pieces next to the first FSW tool such that a pin of the second FSW tool extends through the second joint line, wherein performing the FSW process comprises rotating the pin of the first FSW tool, rotating the pin of the second FSW tool, moving the first FSW tool along the length of the first joint line in a first direction to form the welded joint, and moving the second FSW tool along the length of the second joint line in the first direction to form a second welded joint, wherein the first and second FSW tools are concurrently moved and the second FSW tool trails the first FSW tool.

17. A welding assembly comprising:
a structure defined by two elongated work pieces fixed in place relative to each other, the structure including a joint line defined between respective edges of the two elongated work pieces, the structure including a cavity that extends a length of the joint line; and
a friction stir welding (FSW) tool comprising:
a housing disposed within the cavity;
a pin extending through the joint line and coupled to the housing, the pin configured to rotate relative to the housing and the joint line to perform a FSW process that welds the two elongated work pieces together at the joint line; and
a shoulder disposed outside of the cavity and surrounding the pin, wherein the shoulder is slidable along a length of the pin and is biased towards the housing so that a distal end of the shoulder contacts respective outer surfaces of the work pieces and sandwiches the work pieces between the shoulder and the housing during the FSW process, and wherein the shoulder is configured to be rotated independently of the pin and relative to the housing during the FSW process for the distal end of the shoulder to slide along the outer surfaces of the work pieces.

18. The FSW tool of claim 1, wherein the shoulder is biased towards the housing due to gravitational force on the shoulder.

19. The FSW tool of claim 9, wherein the second spindle rotates the shoulder at least one of at a different rate or in a different direction of rotation than the first spindle rotates the pin during the FSW process.

20. The welding assembly of claim 17, wherein the shoulder is biased towards the housing due to gravitational force on the shoulder.

* * * * *